United States Patent
Hirabayashi

(10) Patent No.: US 10,101,485 B2
(45) Date of Patent: Oct. 16, 2018

(54) METHOD OF COALESCENCE MICROSEISMIC MAPPING INCLUDING MODEL'S UNCERTAINTY

(71) Applicant: Schlumberger Technology Corporation, Sugar Land, TX (US)

(72) Inventor: Nobuyasu Hirabayashi, Yokohama (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 372 days.

(21) Appl. No.: 14/817,190

(22) Filed: Aug. 3, 2015

(65) Prior Publication Data

US 2016/0033666 A1 Feb. 4, 2016

Related U.S. Application Data

(60) Provisional application No. 62/033,075, filed on Aug. 4, 2014.

(51) Int. Cl.
*G01V 1/00* (2006.01)
*G01V 1/50* (2006.01)
*G01V 1/30* (2006.01)
*G01V 1/28* (2006.01)

(52) U.S. Cl.
CPC .............. *G01V 1/50* (2013.01); *G01V 1/288* (2013.01); *G01V 1/305* (2013.01); *G01V 2210/671* (2013.01)

(58) Field of Classification Search
CPC .......... G01V 1/288; G01V 1/50; G01V 1/305; G01V 2210/671
See application file for complete search history.

(56) References Cited

U.S. PATENT DOCUMENTS

| 7,660,199 | B2 | 2/2010 | Drew | |
|---|---|---|---|---|
| 2010/0262373 | A1* | 10/2010 | Khadhraoui | G01V 1/40 702/16 |
| 2014/0126328 | A1* | 5/2014 | Hirabayashi | G01V 1/288 367/73 |

OTHER PUBLICATIONS

J. Drew et al., "Automated Microseismic Event Detection and Location by Continuous Spatial Mapping," 2005 spe Annual Technical Conference and Exhibition held in Dallas, TX USA, Oct. 9-12, 2005.

(Continued)

*Primary Examiner* — Krystine E Breier
(74) *Attorney, Agent, or Firm* — Sara K. M. Hinkley

(57) ABSTRACT

A technique facilitates improved data acquisition and analysis with downhole tools and systems. The downhole tools and systems utilize arrays of sensing devices which are deployed in arrangements for improved sensing of data related to environmental features and/or tool parameters of tools located downhole in a borehole. For example, the tools and sensing systems may be operated to effectively sense and store characteristics related to components of downhole tools as well as formation parameters at, for example, elevated temperatures and pressures. Similarly, chemicals and chemical properties of interest in oilfield exploration and development also may be detected, measured and stored for analysis.

17 Claims, 6 Drawing Sheets

(56) References Cited

OTHER PUBLICATIONS

J. Drew et al., "Microseismic event azimuth estimation: establishing a relationship between hodogram linearity and uncertainty in event azimuth," SEG Las Vegas 2008 Annual Meeting, pp. 1446-1449.
A. Tarantola, B. Valette, "Inverse Problems=Quest for Information," Journal of Geophysics 1982, vol. 50, pp. 159-170.

* cited by examiner

METHOD OF COALESCENCE MICROSEISMIC MAPPING INCLUDING MODEL'S UNCERTAINTY

CROSS-REFERENCE TO RELATED APPLICATIONS

The present document is based on and claims priority to U.S. Provisional Application Ser. No. 62/033,075, Method of Coalescence Microseismic Mapping Including Model's Uncertainty, filed Aug. 4, 2014, which is incorporated herein by reference in its entirety.

BACKGROUND

Hydrocarbon fluids such as oil and natural gas are obtained from a subterranean geologic formation, referred to as a reservoir, by drilling a well that penetrates the hydrocarbon-bearing formation. Analysis of the surrounding formation to find areas of interest (e.g., such as hydrocarbon containing deposits) and to avoid potential hazards are done by a variety of methods. One type of analysis method involves the use of acoustic signals (such as seismic, sonic, and microseismic) generated by a source (either actively or passively) and received by receivers. Complex mathematical manipulation can use factors such as the travel times of received waveforms emitted from the source to locate and determine various parameters and compositions of the geological cross-section.

SUMMARY

In general, a methodology and system are provided to facilitate improved data acquisition and analysis with downhole tools and systems. The downhole tools and systems utilize arrays of sensing devices which are deployed in arrangements for sensing of acoustic data related to environmental features and/or tool parameters of tools located downhole in a borehole. For example, the tools and sensing systems may be operated to effectively sense and store characteristics related to components of downhole tools as well as formation parameters at, for example, elevated temperatures and pressures. Similarly, chemicals and chemical properties of interest in oilfield exploration and development also may be detected, measured and stored for analysis. The present methodology further enables improved mapping and analysis of the acoustic data.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
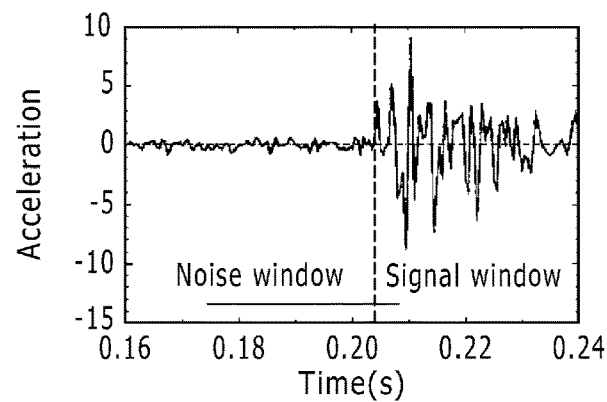
FIG. 1 is a graphical illustration of acceleration versus time with respect to a noise window and a signal window, according to an embodiment of the disclosure.

Reference throughout the specification to "one embodiment," "an embodiment," "some embodiments," "one aspect," "an aspect," or "some aspects" generally indicates a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily referring to the same embodiment. Furthermore, the particular features, structures, methods, or characteristics may be combined in a suitable manner in one or more embodiments. The words "including" and "having" generally have the same meaning as the word "comprising."

As used throughout the specification and claims, the term "downhole" refers to a subterranean environment, e.g. a subterranean environment along a wellbore. "Downhole tool" is used broadly to refer to a tool used in a subterranean environment including, but not limited to, a logging tool, an imaging tool, an acoustic tool, a permanent monitoring tool, and a combination tool. Additionally, "coalesce" or "coalescence" may be used to refer to a coming together of different measures into a map such as a spatial map. The terms also may be used to indicate evaluating the time evolving contributions from multiple sensors or components without including non-linear event location methods. Furthermore, the term "sensor" or "receiver" may be used to refer to a single device location which may have one or more "detectors" able to receive measurements at that location.

The various techniques disclosed herein may be utilized to facilitate and improve data acquisition and analysis in downhole tools and systems. Examples of downhole tools and systems utilize arrays of sensing devices, e.g. receivers, configured or designed for easy attachment and detachment in downhole sensor tools or modules that are deployed for purposes of sensing data relating to environmental and tool parameters downhole, e.g. within a borehole. The sensing systems disclosed herein may effectively sense and store characteristics relating to components of downhole tools as well as formation parameters, e.g. formation parameters involving elevated temperatures and pressures. Chemicals, chemical properties, and a variety of other subterranean features of interest in oilfield exploration and development also may be measured, stored, and evaluated via data obtained from the sensing systems and processed according to data processing techniques described herein.

The sensing system embodiments described herein may be incorporated in tool systems such as wireline logging tools, measurement-while-drilling tools, logging-while-drilling tools, permanent monitoring systems, drill bits, drill collars, sondes, among others. For purposes of the description herein, when the terms wireline, cable line, slickline, coiled tubing, or conveyance are used it should be understood that these and other suitable conveyance systems and techniques may be employed. As described in greater detail below, certain embodiments provide a method of coalescence microseismic mapping which include, e.g. account for, a model's uncertainty. In some cases, the results of the methods and descriptions contained herein may be used for determining hypocenter locations with single well observation during hydraulic fracturing monitoring, indicating the growth and propagation of fractures. This information can be used for better control of fracturing operation and to ensure that critical water deposits are not breached during fracturing operation.

To apply an inverse method using probability density functions (see, for example, Tarantola and Valette: Inverse Problems=Quest for Information. J. Geophys. 42, 159-170, 1982), maximum likelihood, and Coalescence Microseismic Mapping (CMM) (see, for example, Drew et al., Automated microseismic event detection and location by continuous spatial mapping: Proceedings of the Annual Technical Conference and Exhibition, SPE, 95113, 2005) methods to locate hypocenters with insufficient survey configurations, the polarizations of the P- and S-waves may be used to solve the directional ambiguities. Because the qualities of estimated polarizations are substantially varied over receivers, a simple average of directions estimated using polarizations causes substantial errors of the locations.

The error of polarization is defined by the difference between the measured and computed polarizations for the possible hypocenter locations. The cost function is defined using the errors of polarizations and the weight functions computed using signal qualities (e.g., SNR, linearity and orthogonality). The minimization problem may be solved by a grid search in the 3-D space to obtain the most probable location or direction of the hypocenter. From the estimated direction, the probability density function of polarization may be formulated and combined with the marginal probability density function obtained using the picked event times (or product of SNR in CMM) to locate the hypocenters.

To locate hypocenters in a 3-D space using the observed data and velocity model, the information from polarization is used when sufficient coverage of the hypocenter cannot be obtained. This is the case for a single well measurement. Because the qualities of the estimated polarization are substantially varied over receivers, a simple average of directions estimated using polarizations causes substantial errors in determining the locations. Although attempts have been made to establish a relation between linearity and uncertainty of polarization measurements by using synthetic data (see, for example, Drew et al., Microseismic event azimuth estimation: establishing a relationship between hodogram linearity and uncertainty in event azimuth; 2008 SEG Technical Program Expanded Abstracts, 1446-1449), the results are not applicable to real datasets due to the fact that the noises in real data are coherent and their linearity is very high. Embodiments described herein provide a new method to estimate the direction of hypocenter from measured polarizations.

According to an embodiment, a hypocenter location method using simply travel-times is run first to obtain a start time and hypocenter. The tables of travel times and polarizations at the receivers (e.g. look-up tables) may be prepared for the possible hypocenter locations as grids. The travel times and polarizations may be computed using ray tracing, an Eikonal equation or a finite difference method. The polarization at a receiver associated with a picked travel time may be compared to the polarizations stored in the look-up table. The cost function may then be computed using the difference between the measured and computed polarizations for the subject receivers. By minimizing the cost function through the use of the grid search, the most probable location or direction of the hypocenter can be determined. The processed data acquired by minimizing the cost function to determine probable locations and directions of hypocenters may be used via, for example, a processor-based system to evaluate subterranean features, e.g. features related to downhole tools, fractures, geologic or other environmental parameters, petroleum reservoir features, and/or other desired features.

In a first stage of an embodiment, an inverse method using a probability density function (e.g. see Tarantola and Valette, 1982) (or CMM) is applied to find potential candidates for hypocenter location and the start time of the event, then, onset times of event are estimated from the potential candidates. Because a hypocenter location is computed using simply the travel times with insufficient survey configurations, there are directional ambiguities for hypocenter locations where the start time of an event cannot be uniquely determined Regarding the signal components to be used in the computation of direction of hypocenter location, both the P- and S-waves, the P-waves alone, or the S-waves alone may be specified by the users. The obtained start time is used to restrict grid points in the grid search. The computed event time for the i-th receiver may be defined by:

$$T_i(x,y,z) = T_0 + t_i(x,y,z)$$

where $T_i(x,y,z)$ is a computed onset time of an event signal at the i-th receiver for the hypocenter at (x,y,z) and $T_0$ is the start time of event. $t_i(x,y,z)$ is the travel time between the hypocenter (x,y,z) and the i-th receiver.

The grid search in the following procedure is restricted for the grid points which satisfy:

$$|T_i(x,y,z) - \text{Pick}_i| < \Delta T$$

where $\text{Pick}_i$ is the picked time of event signal and $\Delta T$ is a parameter defined by the users.

A look-up table, which stores the travel-times from hypocenters to a receiver and the polarization vectors at a receiver, may be created in a volume where hypocenters are anticipated. By way of example, a look-up table may be created using ray tracing, an Eikonal equation, or a finite difference method. The error of polarization vectors may be defined by:

$$\theta_{i,Error}(x,y,z) = |A\cos(P_{i,mes} \cdot P_{i,comp}(x,y,z))|$$

where i is the index of a receiver, $\theta_{i,Error}$ is the polarization error, and $P_{i,mes}$ and $P_{i,comp}(x,y,z)$ are the measured and computed polarization vectors at the i-th receiver for the hypocenter location at (x,y,z), respectively. The vectors used in this example are normalized.

The hypocenter location or most probable direction of the hypocenter may be solved by minimizing the cost function defined by:

$$\theta_{Error}(x, y, z) = \left( \frac{\sum_{i=1}^{N} w_i \theta_{i,Error}^n(x, y, z)}{\sum_{i=1}^{N} w_i} \right)^{-n}$$

where n is an appropriate power to be selected and $w_i$ is a weight function of signal-to-noise (SNR), linearity, and orthogonality of an event signal denoted by:

$$w_i = f(SNR_i, Linearity_i, Orthogonality_i).$$

The weight function may be simply written as:

$$w_i = SNR_i^p \cdot Linearity_i^q \cdot Orthogonality_i^r$$

where p, q and r are appropriate powers to be selected. SNR in the above equation may be replaced by:

$$SNR' = \max(SNR-1, 0).$$

By denoting (x',y',z') that minimizes $\theta_{Error}(x,y,z)$, the joint probability density function (PDF) of polarization to be applied in the method using probability density function may be defined by:

$$PDF(x, y, z) = \prod_i \exp\left[ -\frac{1}{2} \left( \frac{\theta_{i,Error}(x, y, z) - \theta_{i,Error}(x', y', z')}{\sigma_i} \right)^2 \right]$$

where $$\sigma_i = \max(\theta_{i,Error}(x', y', z'), \theta_{min})$$

and $\theta_{min}$ is the minimum angle defined by the users.

By defining a standard deviation as:

$$\sigma_\theta = \left( \sum_i \sigma_i^{-2} \right)^{-2}$$

in the vicinity of (x',y',z')

$$\frac{\theta_{Error}(x, y, z) - \theta_{Error}(x', y', z')}{\sigma_\theta} \approx \sum_i \left( \frac{\theta_{i,Error}(x, y, z) - \theta_{i,Error}(x', y', z')}{\sigma_i} \right)^2$$

is anticipated for rather good quality data. Therefore the joint PDF may be defined by:

$$PDF(x, y, z) = \exp\left[ -\frac{1}{2} \left( \frac{\theta_{Error}(x, y, z) - \theta_{Error}(x', y', z')}{\sigma_\theta} \right)^2 \right]$$

or more simply it may be defined by:

$$PDF(x, y, z) = \exp\left[ -\frac{1}{2} \left( \frac{\theta_{Error}(x, y, z)}{\sigma_\theta} \right)^2 \right]$$

By choosing appropriate n, a robust estimation for bad quality data is stably made using the above equation.

In some embodiments, the Coalescence Microseismic mapping method using a model's uncertainty may be given by the following equation:

$$F(x, y, z) = \int \prod_{i=1}^{N} f_i(\tau_i) \exp\left( -\frac{1}{2} (\tilde{\tau} - \tilde{h}(x, y, z))^T C_T^{-1} (\tilde{\tau} - \tilde{h}(x, y, z)) \right) d\tau_1 \ldots d\tau_N$$

The multiple integral may be applied for the time duration where event signals are found. The polarization PDF also may be applied using the previously described method.

In this example, the characteristic function is defined as:

$$f(t) = \sqrt{\frac{nw \int_t^{t+sw} A^2(\tau) d\tau}{sw \int_{t-nw}^{t} A^2(\tau) d\tau}}$$

where f(t) is the characteristic function, nw and sw are window lengths, A(t) is the envelope of seismic traces. A(t) is computed for the 3 component data or the projected data based on the polarization estimated by signal or model. A smoothing operator, e.g. a Hanning filter, may be applied to A(t). (See the graphical representations of acceleration versus time and SNR versus time in FIGS. 1-3).

Figure 4:
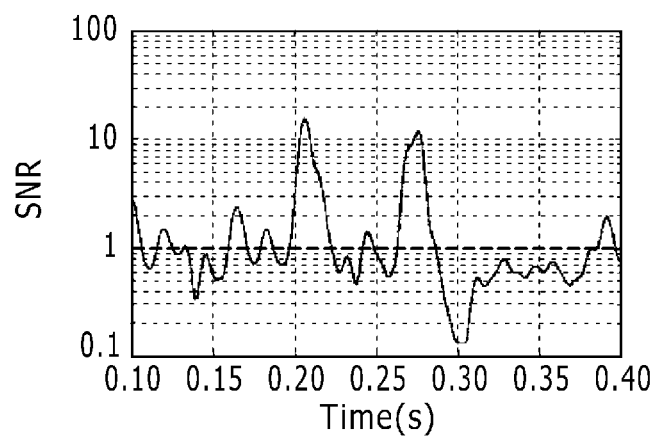
FIG. 4 is a graphical illustration showing an unmodified characteristic function, according to an embodiment of the disclosure.
Figure 5:
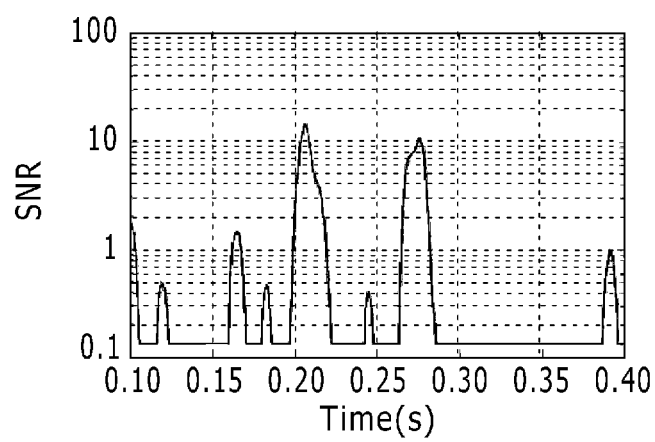
FIG. 5 is a graphical illustration showing a modified characteristic function, according to an embodiment of the disclosure.

The characteristic function may be modified as:

$$g(t) = \max(f(t)-1, \varepsilon)$$

where ε is appositive number sufficiently smaller than one. Examples of the SNR versus time and the modified SNR versus time are illustrated graphically in FIGS. 4 and 5, respectively.

By regarding the modified characteristic function as PDF, CMM containing the model error may be defined as:

$$F(x,y,z) = \int \prod_{i=1}^{N} f_i(\tau_i) \exp(-\frac{1}{2}(\tilde{\tau}-\tilde{h}(x,y,z))^\tau C_T^{-1}(\tilde{\tau}-\tilde{h}(x,y,z))) d\tau_1 \ldots d\tau_N$$

where i and N are the index and number of modified characteristic functions. A single index may be used when the multi-components are used. $\tau_i$ is the recording time, and $f_i(\tau_i)$ is the modified characteristic function. $\tilde{\tau}$ is the vector defined as:

$$\tilde{\tau}_i = \tau_i - \bar{\tau}$$

$$\bar{\tau} = \frac{\sum_{i=1}^{N} w_i \tau_i}{\sum_{i=1}^{N} w_i}$$

where $w_i$ is the weight defined as below.

In this example, $\tilde{h}(x,y,z)$ is the vector and may be defined as:

$$\tilde{h}_i(x, y, z) = h_i(x, y, z) - \bar{h}(x, y, z)$$

$$\bar{h}(x, y, z) = \frac{\sum_{i=1}^{N} w_i h_i(x, y, z)}{\sum_{i=1}^{N} w_i}$$

where $h_i(x,y,z)$ is the travel time. The weight may be computed using the covariance matrix as $$w_j = \sum_{i=1}^{N} p_{ij}$$

$$C_T = \sigma_{ij}$$

$$C_T^{-1} = p_{ij}$$

where $\sigma_{ij}$ is computed as:

$$\sigma_{i,j} = \sigma_T^2 \exp\left(-\frac{1}{2}\frac{D_{ij}^2}{\Delta^2}\right)$$

$\sigma_\tau$ is the model's uncertainty specified by the users, $D_{ij}$ is the distance between the receiver positions of the i and j traces, and $\Delta$ is the correlation length.

The multiple integral with respect to $\tau_i$ may be applied for the time duration where event signals are found.

Figure 6:
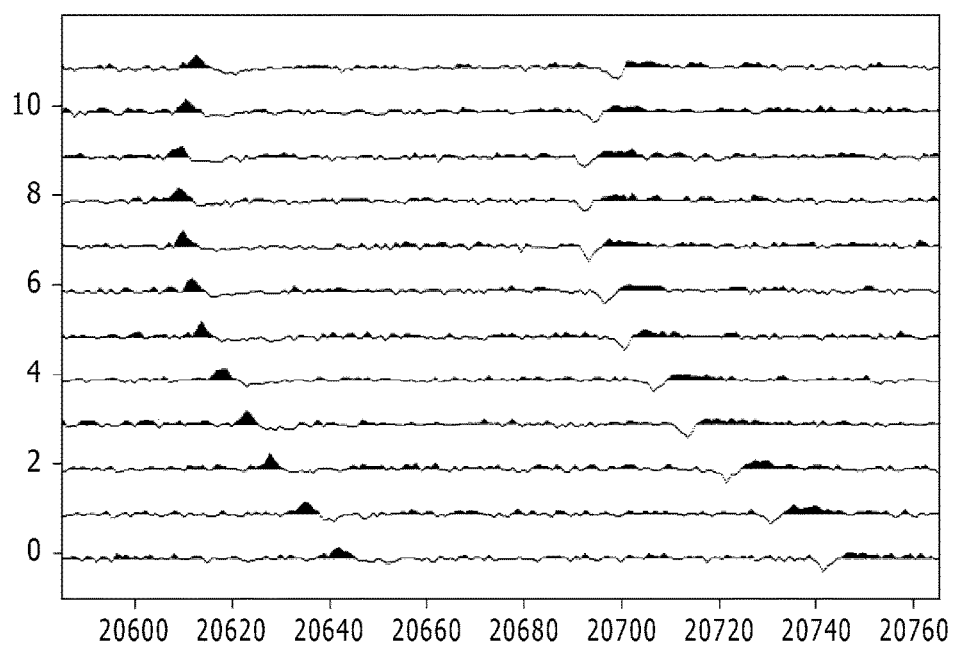
FIG. 6 is a graphical illustration showing an example of a plurality of synthetic waveforms, e.g. synthetic waveforms to test an onset time estimation, according to an embodiment of the disclosure.
Figure 7:
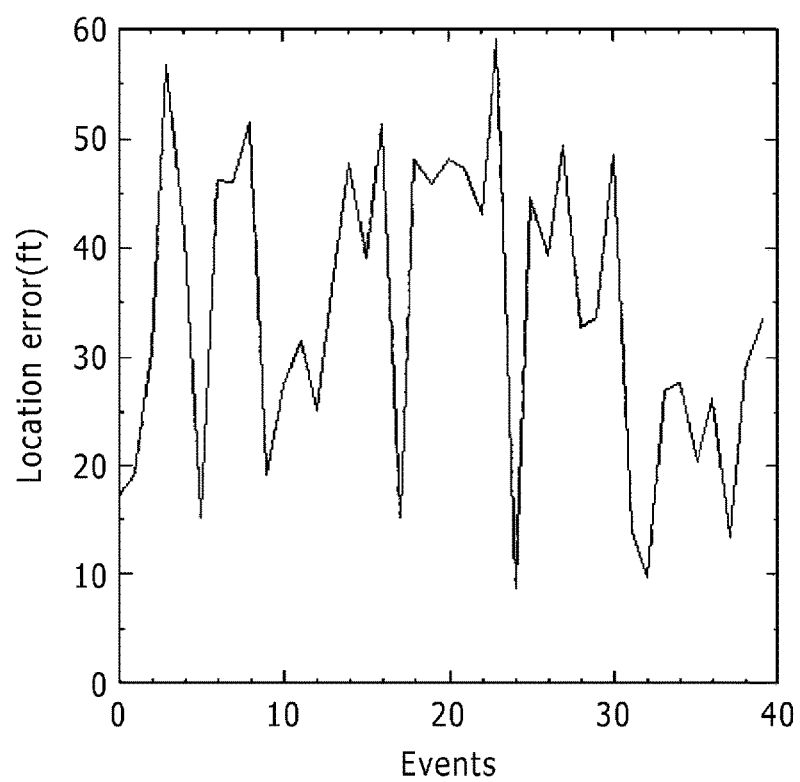
FIG. 7, is a graphical illustration showing location error versus events, according to an embodiment of the disclosure.

Synthetic data may be used to validate the methodology. According to an example, a plurality of receivers, e.g. 12 receivers, may be installed in a vertical well and a 2-D (r-z) problem is solved. The Monte-Carlo method may be used for the multiple time integrations. Referring generally to FIG. 6, a graphical illustration is provided of the 12 synthetic waveforms. The data may be processed to determine location errors for the seismic events, as illustrated in FIG. 7.

In another embodiment, an onset estimation method using Coalescence Microseismic Mapping may be utilized. This method uses 1) Modified characteristic function, 2) Onset time estimation using the location and origin time that are estimated by CMM, 3) temporal buffer lists to merge and select detection results, and 4) event location method using the onset estimation results.

In at least some embodiments, a velocity model may be used to compute the travel-times and polarizations of, for example, the P-, SH- and SV-waves. The waves are selected depending on the survey configuration and the data condition (e.g. P-wave alone, P- and SH-waves combined, or other suitable waves/wave combinations). The grids in the 3-D space are used to estimate the onset times.

A maximum grid size may be defined as:

$$\delta x = \frac{\sqrt{2}}{2} \min(V_{P,min} sw_P, V_{S,min} sw_S) \text{ for 2-}D$$

$$\delta x = \frac{2\sqrt{3}}{3} \min(V_{P,min} sw_P, V_{S,min} sw_S) \text{ for 3-}D$$

where $V_{p,min}$ and $V_{s,min}$ are minimum P- and S-velocities; and $sw_p$ and $sw_s$ are signal windows for P- and S-waves respectively. The signal window is defined in greater detail below.

The projection of 3 component waveforms to a scalar function is effective for extracting a targeted signal component (e.g., P-, SH- or SV-waves) and for avoiding contamination by the other signal components. The inner product is taken with the 3 component waveforms and reference vector as:

$$g(t,x,y,z) = \text{ref}(x,y,z) \cdot (g_x(t), g_y(t), g_z(t))$$

where $g(t, x, y, z)$ is the project waveform, $\text{ref}(x,y,z)$ is the reference vector, and $(g_x(t), g_y(t), g_z(t))$ is the 3 component waveforms. $\text{ref}(x,y,z)$ is the polarization direction of signal component to be extracted. $\text{ref}(x,y,z)$ may be taken from a-priori information such as the direction from the receivers to an injection point or the polarizations computed using the model (in this case, the projected waveforms are computed for the location). The azimuthal component of $\text{ref}(x,y,z)$ may be used alone because the inclination information tends to be less accurate.

Figure 2:
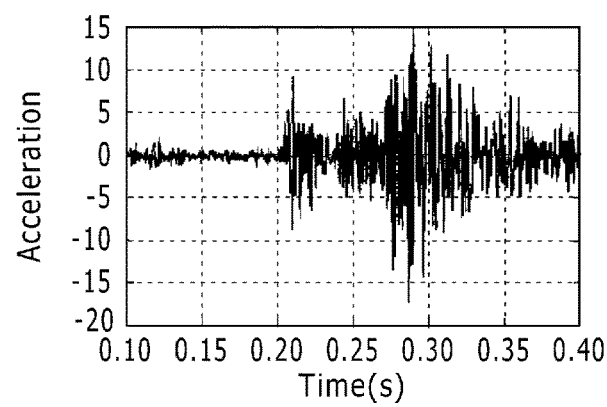
FIG. 2 is a graphical illustration showing waveforms containing P- and S-event signals, according to an embodiment of the disclosure.
Figure 3:
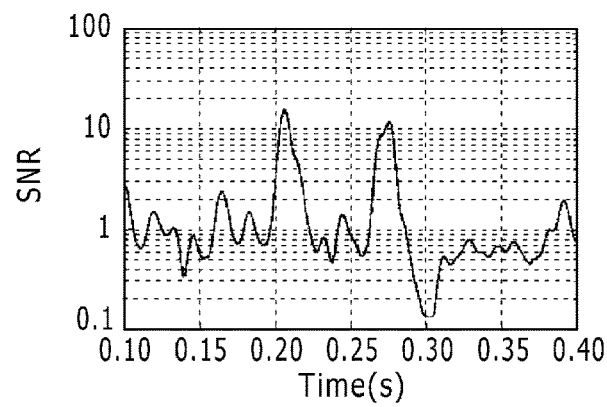
FIG. 3 is a graphical illustration showing a characteristic function, according to an embodiment of the disclosure.

A characteristic function may be defined as:

$$f(t) = \sqrt{\frac{nw \int_t^{t+sw} A^2(\tau) d\tau}{sw \int_{t-nw}^{t} A^2(\tau) d\tau}}$$

where $f(t)$ is the characteristic function, nw and sw are window lengths, and $A(t)$ is the envelope of seismic traces. $A(t)$ is computed for the 3 component data or the projected data based on the polarization estimated by signal or model. A smoothing operator, such as a Hanning filter, may be applied to $A(t)$. $f(t)$ is also called with respect to SNR as it is the ratio of root mean square (RMS)s of the window graphically illustrated in FIG. 1. FIG. 1 illustrates the signal window and the preceding noise window. Often sw may be chosen as a half of dominant period of signal and nw is chosen as three to six times of Fay. It should be noted FIGS. 2 and 3 illustrate examples of the signal and characteristic functions. Additionally, FIGS. 4 and 5, respectively, represent examples of the unmodified and modified characteristic functions. As referenced above, the characteristic function may be modified as:

$$g(t) = \max(f(t)-1, \varepsilon)$$

where $\varepsilon$ is a positive number sufficiently smaller than one. $\varepsilon$ can be $e^{-2}$ or $e^{-4}$.

A time-space CMM function may be defined as:

$$F(t, x, y, z) = \prod_{i=1}^{N} \prod_{j=1}^{M} f_{ij}(t + T_{ij}(x, y, z))$$

or $$F(t, x, y, z) = \min_j \left[ \prod_{i=1}^{N} f_{ij}(t + T_{ij}(x, y, z)) \right]$$

where $(t,x,y,z)$ is the origin time and location to be tested, and are indices of receiver and wave component (e.g., P-, SH- and SV-waves), N and M are numbers of receivers and wave components, $f_{ij}(t)$ is the modified characteristic function, and $T_{ij}(x,y,z)$ is the travel-time of the j-th component wave from the receiver to the location.

Components to be used are selected according to the data (e.g. P-waves alone, P- and SH-waves, or other suitable waves/wave combinations). The orthogonality of polarization may be optionally added as:

$$F(t, x, y, z) = \prod_{i=1}^{N} Orth_i(t, x, y, z) \prod_{j=1}^{M} f_{ij}(t + T_{ij}(x, y, z))$$

$$Orth_i(t, x, y, z) = \prod_{j<k} [1 - \{p_i(t + T_{ij}(x, y, z)) \cdot p_i(t + T_{ik}(x, y, z))\}^2]$$

where $p_i(t)$ is the polarization vector.

Figure 8:
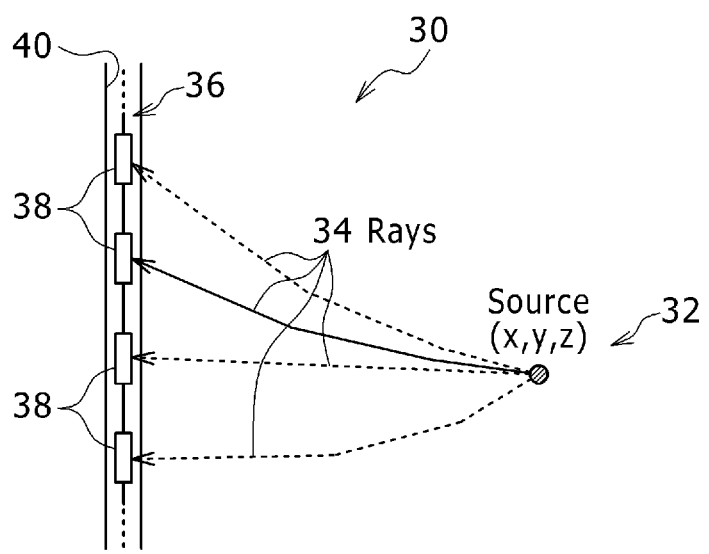
FIG. 8, is a schematic illustration of a downhole system utilizing a ray tracing for a given location and a downhole array, according to an embodiment of the disclosure.

In FIG. 8, an embodiment of a monitoring system 30 is provided to illustrate ray tracing for a given formation location 32 which serves as the source/event 32 for a plurality of rays 34 which are received by a downhole array 36. The downhole array 36 may comprise a plurality of tool/receivers 38 disposed in, for example, a wellbore 40. When the number of receivers 38 is large, the multiplications may be changed to summation by taking logarithms. As shown, this embodiment may be a single well monitoring system using a wireline or other conveyed downhole array 36.

According to an embodiment, the threshold of time-space CMM function may be given by:

$$Threshold_{Detection} = Threshold_{SNR}^{(1-\alpha)NM} \varepsilon^{\alpha NM}$$

If a strict detection option is used, the threshold may be given by:

$$Threshold_{Detection} = Threshold_{SNR}^{(1-\alpha)N} \varepsilon^{\alpha N}$$

where $Threshold_{SNR}$, is the reference SNR value and a is the failure ratio.

An orthogonality constraint is optionally applied to the time-space CMM function as follows:

$$Orth > OrthLimit$$

$$Orth = \frac{1}{\sum_{i=1}^{N} w_i} \sum_{i=1}^{N} w_i Orth_i(t, x, y, z)$$

$$w_i = \sqrt{f_{ij}(\tau_j) f_{ik}(\tau_k)}$$

The summation may be taken for the orthogonality whose SNR is greater than a threshold as $w_i > Threshold_{SNR}$.

Onset times may be estimated at a given time, $K\Delta t$, for a location that satisfies:

$$\max_{x,y,z} F(k\Delta t, x, y, z) \geq Threshold_{Detection}$$

or $$F(k\Delta t, x, y, z) \geq Threshold_{Detection}$$

For the former and latter cases, the onset times may be estimated for single and multiple grid points respectively. Suppose a point $(x_0, y_0, z_0)$ satisfies the above equations, the onset times may be estimated using travel times, which, in turn, may be computed using a velocity model as:

$$\widetilde{\tau_{i,j}} = k\Delta t + T_{ij}(x_0, y_0, z_0)$$

where $\widetilde{\tau_{i,j}}$ is the estimated onset time for the j-th signal component of the i-th receiver, k is the index of time, $\Delta t$ is the sampling period, and $T_{ij}(x_0, y_0, z_0)$ is the travel time of j-th signal component between the location $(x_0, y_0, z_0)$ and the i-th receiver position. For the signals that satisfy $f_{ij}(\widetilde{\tau_{i,j}}) \geq Threshold_{SNR,ij}$, the accurate onset times are determined by finding the maximum of $f_{ij}(t)$ in a window centered by $\widetilde{\tau_{i,j}}$. The correction value $\delta\tau(-sw_{ij} < \delta\tau < sw_{ij})$ is selected so that $$f_{ij}(\widetilde{\tau_{i,j}} + \delta\tau) = \max_{-sw_{ij} < \delta t < sw_{ij}} f_{ij}(\widetilde{\tau_{i,j}} + \delta t)$$

The signal window length of the characteristic function may be used for the length of window, $sw_{ij}$. If a smoothing operator is applied to $f_{ij}(t)$, the length of window $sw_{ij}$ is the addition of the signal window length and operator length. Then the onset time may be obtained as:

$$\tau_{ij} = \widetilde{\tau_{i,j}} + \delta\tau$$

for the signal which satisfies:

$$f_{ij}(\tau_{ij}) \geq Threshold_{SNR,ij}$$

where $Threshold_{SNR,ij}$ is the threshold for SNRs.

For the obtained onset times, the orthogonality constraint may be applied for the multi component case. If the constraint is not satisfied, the onset times are rejected. Using the characteristic function for the obtained onset times, a new detection function may be computed as:

$$Detect = \prod_{ij} \overline{f_{ij}}(\tau_{ij})$$

or $$Detect = \min_j \left[ \prod_i \overline{f_{ij}}(\tau_{ij}) \right]$$

where $$\overline{f_{ij}}(\tau_{ij}) = f_{ij}(\tau_{ij}) \text{ if } f_{ij}(\tau_{ij}) \geq Threshold_{SNR,ij} \text{ (for all } j\text{)}$$

$$\overline{f_{ij}}(\tau_{ij}) = \varepsilon \text{ if } f_{ij}(\tau_{ij}) < Threshold_{SNR,ij} \text{ (for all } j\text{)}$$

If the number of onset times that satisfy:

$$f_{ij}(\tau_{ij}) \geq Threshold_{SNR,ij} \text{(for all } j\text{)}$$

is less than the threshold, $Threshold_N$, the selected onset times are canceled.

Lists may be established to save onset times and other attributes in temporal lists as follows: $Onset_{ij}[l]$ is the l-th entry of $\tau_{ij}$, $SNR_{ij}[l]$ is $\overline{f_{ij}}(\tau_{ij})$, Detection [l] is Detect, and M is the number of entries. When $Detect \geq Threshold_{Detection}$, the new entries are saved.

Various options may be used to operate temporal lists. According to a first embodiment, an option is to replace overlapped events and compress temporal lists. If, for example, $Onset_{ij}[l]$ and $Onset_{ij}[m]$ (l<m) for any i and all j satisfy:

$$SNR_{ij}[l] \geq Threshold_{SNR,ij}$$

$$SNR_{ij}[m] \geq Threshold_{SNR,ij}$$

$$|Onset_{ij}[l] - Onset_{ij}[m]| \leq sw_{ij}$$

and $$Detection[m] > Detection[l]$$

Then the m-th entries are copied to the l-th entries and the m-th entries are removed from the lists.

According to a second embodiment, another option is to merge overlapped events and compress temporal lists. If, for example, $Onset_{ij}[l]$ and $Onset_{ij}[m]$ for any i and all j satisfy:

$$SNR_{ij}[l] \geq Threshold_{SNR,ij}$$

$$SNR_{ij}[m] \geq Threshold_{SNR,ij}$$

$$|Onset_{ij}[l] - Onset_{ij}[m]| \leq sw_{ij}$$

Then for n that satisfies:

$$SNR_{ij}[l] < Threshold_{SNR,ij}$$

$$SNR_{ij}[m] \geq Threshold_{SNR,ij}$$

entries of the list are copied as:

$$\text{Onset}_{ij}[l] = \text{Onset}_{ij}[m]$$

$$\text{SNR}_{ij}[l] = \text{SNR}_{ij}[m]$$

and Detection[l] is computed for new $\text{SNR}_{ij}[l]$. Ultimately, the m-th entries may be removed from the lists. This operation may be continued until the various l and m combinations are tested. If inconsistency happens, the event may be saved as a new event.

Another option may be to merge distinct events in a certain time window and compress temporal lists. If, for example, any i and n (i≠n) for all j satisfy:

$$SNR_{ij}[l] \geq \text{Threshold}_{SNR,ij} \text{ and } SNR_{ij}[m] < \text{Threshold}_{SNR,ij}$$

$$SNR_{nj}[l] < \text{Threshold}_{SNR,nj} \text{ and } SNR_{nj}[m] \geq \text{Threshold}_{SNR,nj}$$

$$\max_{i,n,j}(\text{Onset}_{ij}[l] - \text{Onset}_{nj}[m]) \leq T$$

entries of lists are copied as:

$$\text{Onset}_{nj}[l] = \text{Onset}_{ij}[m]$$

$$\text{SNR}_{nj}[l] = \text{SNR}_{ij}[m]$$

and Detection[l] is computed for new $\text{SNR}_{ij}[l]$ where T is a threshold specified by the users.

Ultimately, the m-th entries are removed from the lists. It should be noted that indices i which satisfy $$SNR_{ij}[l] < \text{Threshold}_{SNR,ij} \text{ and }$$
$$SNR_{ij}[m] < \text{Threshold}_{SNR,ij}$$

can be ignored. This operation may be continued until all l and m combinations are tested. If inconsistency happens, the event may be saved as a new event.

Some embodiments involve removal of multiple detections for a single onset time. There are cases in which an onset time is detected as the P- and SH-waves of different events. In such a case, the orthogonality may be used to select events. In this example, one event is saved in the lists and others are removed.

Onset times also may be provided using the time-space CMM function. Accordingly, the event location method by Tarantola & Valette (1982) may be applied in some embodiments. In this example, a single index may be used for the receivers and signal components according to the following:

$$\sigma_P(x, y, z) = \exp\left(-\frac{1}{2}(\tilde{\tau} - \tilde{h}(x, y, z))^T P(\tilde{\tau} - \tilde{h}(x, y, z))\right)$$

where $$P = (C_t + C_T)^{-1} = [p_{ij}]$$

$$\tilde{\tau}_i = \tau_i - \bar{\tau}$$

$$\bar{\tau} = \frac{\sum_{i=1}^{N} w_i \tau_i}{\sum_{i=1}^{N} w_i}$$

$$\tilde{h}_i(x, y, z) = h_i(x, y, z) - \bar{h}(x, y, z)$$

-continued $$\bar{h}(x, y, z) = \frac{\sum_{i=1}^{N} w_i h_i(x, y, z)}{\sum_{i=1}^{N} w_i}$$

$$w_j = \sum_{i=1}^{N} p_{ij}$$

The covariance matrix $C_t$ is diagonal and its elements may be:

for $f_i(\tau_i) > \gamma e^{-2}$ $$\sigma_{ii} = \frac{sw}{\sqrt{-2\log\frac{\gamma e^{-2}}{f_i(\tau_i)}}}$$

else $$\sigma_{ii} = sw$$

$$\sigma_{ij} = \sigma_T^2 \exp\left(-\frac{1}{2}\frac{D_{ij}^2}{\Delta^2}\right)$$

Figure 9:
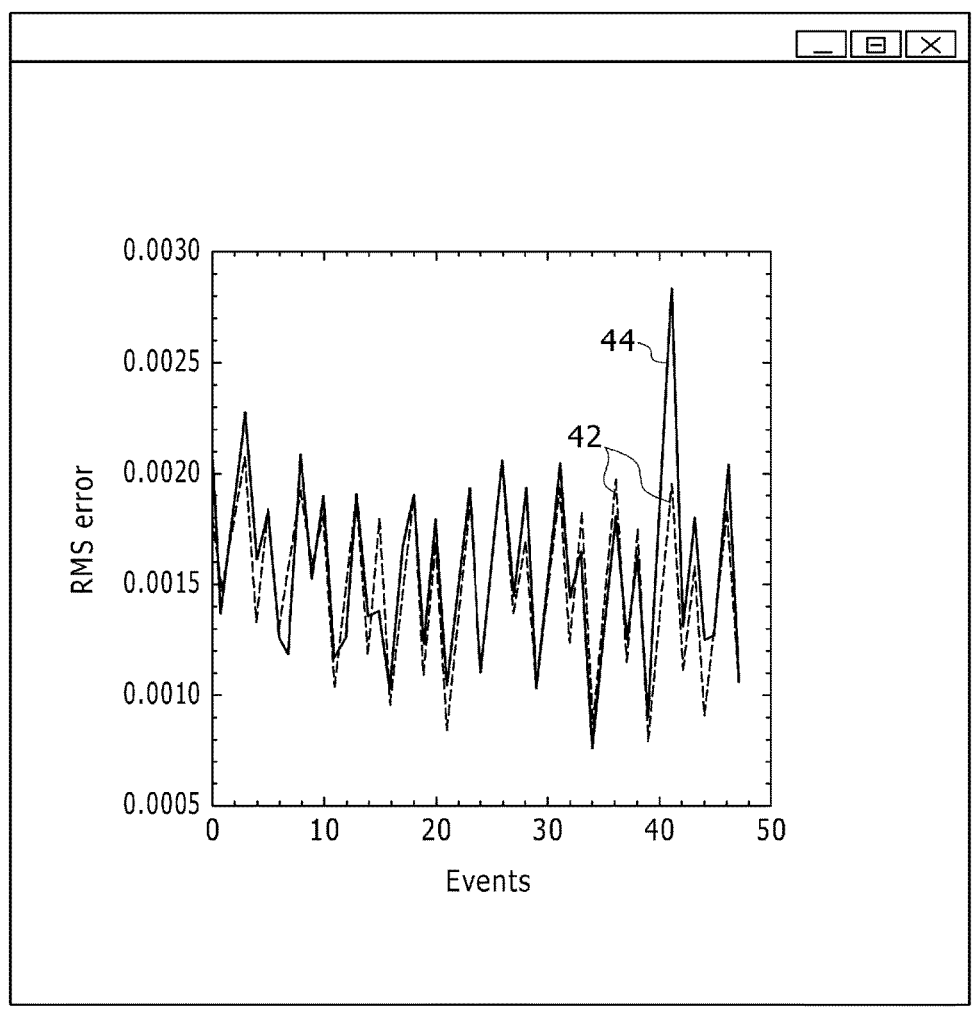
FIG. 9, is a graphical illustration showing RMS errors of onset time estimation versus events, according to an embodiment of the disclosure.

As with certain embodiments described above, a synthetic test may be conducted to validate the methodology. For example, synthetic waveforms may be generated for a plurality of level downhole tools, e.g. 12 downhole tools/receivers, using a constant velocity model. Random noises may be added. For the onset time estimation, the P- and S-velocities may be perturbed by a desired amount, e.g. +2% and −2%, respectively. Synthetic waveforms, such as synthetic waveforms similar to those illustrated in FIG. 6 enable testing of the onset time estimation. In FIG. 9, a graphical example is provided illustrating the RMS errors versus events. The graphical example shows RMS errors of onset time estimation. In this example, the curves or lines 42, 44 show the RMS errors of the P- and SH-waves respectively. It should be noted the evaluation of acoustic data received by receivers 38, the establishment of grids, the determination/use of cost functions, the use of formulas/algorithms described herein, and/or the output of information regarding subterranean features may be carried out automatically via a processor-based system, e.g. a processor-based computer.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method for evaluating subterranean features, comprising:
    obtaining event onset times using candidates of start time and hypocenter location given by Coalescence Microseismic Mapping (CMM);
    computing travel times and polarizations of acoustic waves using ray tracing;
    preparing tables of travel times and polarizations at a plurality of receivers based on the ray tracing to establish hypocenter locations as a grid;

comparing the polarizations associated with travel times of the acoustic waves received at receivers with polarizations previously computed and stored;
determining a cost function using differences between measured at obtained event onset times and computed polarizations at the receivers; and
establishing probable locations of hypocenters by minimizing the cost function via grid searching of the grid,
wherein determining the cost function comprises determining the cost function defined by:

$$\theta_{Error}(x, y, z) = \left( \frac{\sum_{i=1}^{N} w_i \theta_{i,Error}^n (x, y, z)}{\sum_{i=1}^{N} w_i} \right)^{-n}$$

where n is a power selected and $w_i$ is a weight function of signal-to-noise (SNR), linearity and orthogonality of an event signal denoted by:

$w_i = f(SNR_i, Linearity_i, Orthogonality_i)$.

2. The method as recited in claim 1, wherein establishing further comprises establishing probable directions of the hypocenters.

3. The method as recited in claim 1, wherein using the candidates of start time and hypocenter location given by Coalescence Microseismic Mapping (CMM) comprises applying an inverse method using a probability function to find potential candidates of start time and hypocenter location of events.

4. The method as recited in claim 1, wherein computing travel times and polarizations of acoustic waves comprises using acoustic waves in the form of P-waves.

5. The method as recited in claim 1, wherein computing travel times and polarizations of acoustic waves comprises using acoustic waves in the form of S-waves.

6. The method as recited in claim 1, wherein computing travel times and polarizations of acoustic waves comprises using acoustic waves in the form of P-waves and S-waves.

7. The method as recited in claim 1, wherein computing travel times and polarizations comprises using a velocity model.

8. The method as recited in claim 1, further comprising estimating onset times for single and multiple grid points of the grid.

9. The method as recited in claim 8, further comprising saving the onset times in temporal lists.

10. A method, comprising:
deploying an array of sensing devices to monitor acoustic waves resulting from acoustic events;
measuring travel times and polarizations of the acoustic waves received by the array of sensing devices;
computing a grid of stored travel times and polarizations;
establishing a cost function using differences between measured and computed travel times and polarizations;
minimizing the cost function via a grid search to establish probable locations and directions of hypocenters; and
outputting information related to the hypocenters,
wherein establishing comprises establishing the cost function by:

$$\theta_{Error}(x, y, z) = \left( \frac{\sum_{i=1}^{N} w_i \theta_{i,Error}^n (x, y, z)}{\sum_{i=1}^{N} w_i} \right)^{-n}$$

where n is a power selected and $w_i$ is a weight function of signal-to-noise (SNR), linearity, and orthogonality of an event signal denoted by: $w_i = f(SNR_i, Linearity_i, Orthogonaity_i)$.

11. The method as recited in claim 10, wherein deploying comprises deploying the array of sensing devices in a wellbore.

12. The method as recited in claim 10, wherein measuring comprises measuring P-waves.

13. The method as recited in claim 10, wherein measuring comprises measuring S-waves.

14. The method as recited in claim 10, wherein computing comprises computing via a processor-based computer.

15. The method as recited in claim 10, further comprising using data obtained by minimizing the cost function to evaluate a subterranean feature.

16. A method, comprising:
comparing a measured polarization, associated with a travel time of an acoustic signal received at a receiver, with a stored polarization;
computing a difference between the measured polarization and the stored polarization;
using the difference to determine a probable location of a hypocenter wherein using comprises determining a cost function to evaluate the difference between the measured polarization and the stored polarization; and
outputting data on the probable location to facilitate evaluation of a subterranean feature,
wherein determining the cost function comprises determining the cost function defined by:

$$\theta_{Error}(x, y, z) = \left( \frac{\sum_{i=1}^{N} w_i \theta_{i,Error}^n (x, y, z)}{\sum_{i=1}^{N} w_i} \right)^{-n}$$

where n is a power selected and $w_i$ is a weight function of signal-to-noise (SNR), linearity, and orthogonality of an event signal denoted by:

$w_i = f(SNR_i, Linearity_i, Orthogonality_i)$.

17. The method as recited in claim 16, wherein comparing comprises comparing measured polarizations received at a plurality of receivers arranged in a subterranean array.

* * * * *